United States Patent [19]
Romkee

[11] Patent Number: 5,846,469
[45] Date of Patent: Dec. 8, 1998

[54] METHOD FOR MANUFACTURING A DEFIBRILLATION ELECTRODE

[75] Inventor: D. Scott Romkee, Santa Clara, Calif.

[73] Assignee: Pacesetter, Inc., Sunnyvale, Calif.

[21] Appl. No.: 657,715

[22] Filed: May 30, 1996

[51] Int. Cl.⁶ ...................................................... B29C 70/72
[52] U.S. Cl. ................................ 264/272.15; 264/272.11; 264/276; 264/278
[58] Field of Search ........................... 264/271.1, 272.11, 264/259, 276, 278, 272.17, 275, 272.15

[56] References Cited

U.S. PATENT DOCUMENTS

| | | | |
|---|---|---|---|
| 5,226,260 | 7/1993 | Mar et al. | 51/319 |
| 5,244,838 | 9/1993 | Casati et al. | 264/272.17 |
| 5,273,702 | 12/1993 | Nelson et al. | 264/276 |
| 5,342,569 | 8/1994 | Murasaki | 264/276 |
| 5,370,517 | 12/1994 | Casati et al. | 264/272.17 |
| 5,439,485 | 8/1995 | Mar et al. | 607/119 |
| 5,441,690 | 8/1995 | Ayala-Esquilin et al. | 264/277 |

Primary Examiner—Angela Ortiz
Attorney, Agent, or Firm—Steven M. Mitchell

[57] ABSTRACT

A method of manufacturing an implantable electrode using a mold having a chamber with a compressible interior surface portion. Encapsulant and a conductive lead are placed into the chamber, and the mold is closed. With the mold closed, the compressible interior surface portion of the mold is biased against the lead at a region of contact with the lead, such that the biasing squeezes or excludes any encapsulant from between the lead and the mold at the region of contact. The electrode may have a body having an active portion with a smoothly contoured surface. The active portion may include a conductive wire partially embedded in an electrically insulative encapsulant, with the surface of the active portion comprising a major insulative surface portion defined by the surface of the encapsulant, and a plurality of curved conductive surface portions defined by exposed portions of the surface of the wire. Each of the conductive surface portions may have a perimeter bounded by a skirt portion of the insulative surface portion, and each skirt portion may be a smoothly curved transition between the insulative surface portion and the respective conductive surface portion, such that there are no sharp or rough grooves, angles, or edges on the active portion.

14 Claims, 5 Drawing Sheets

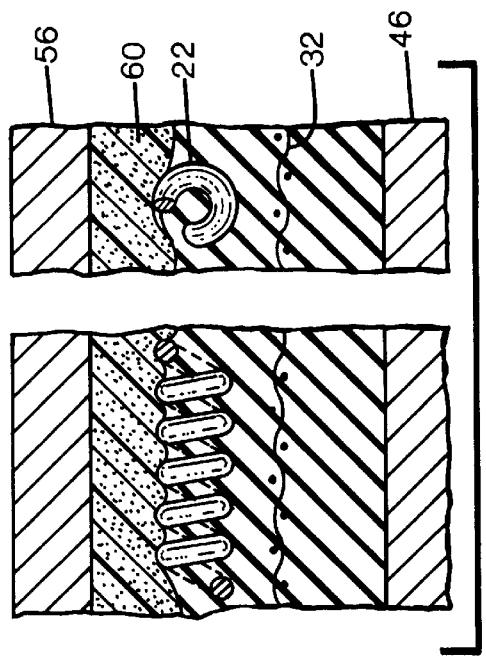
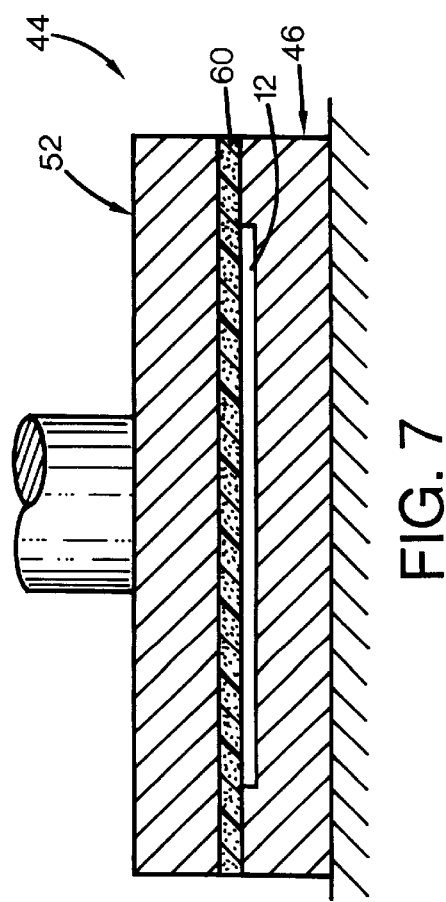
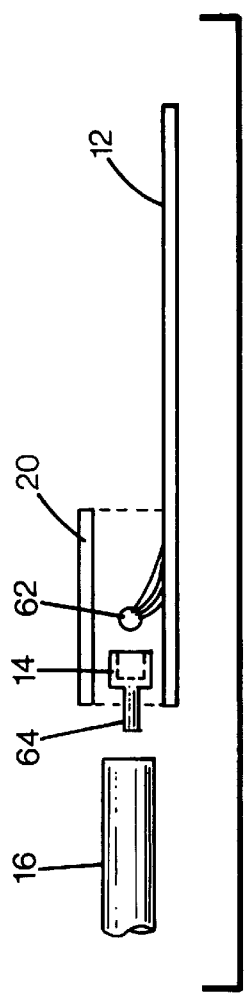
FIG. 7A
FIG. 7
FIG. 8

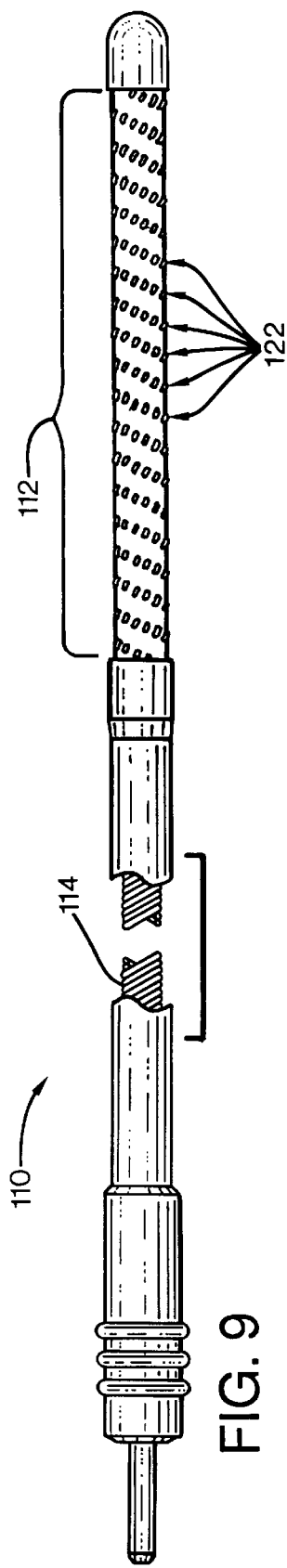
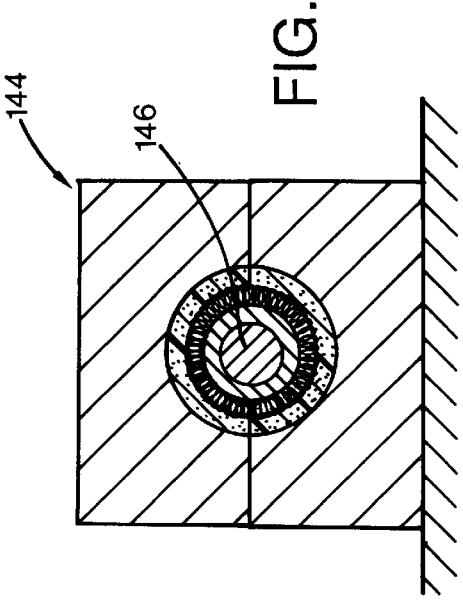
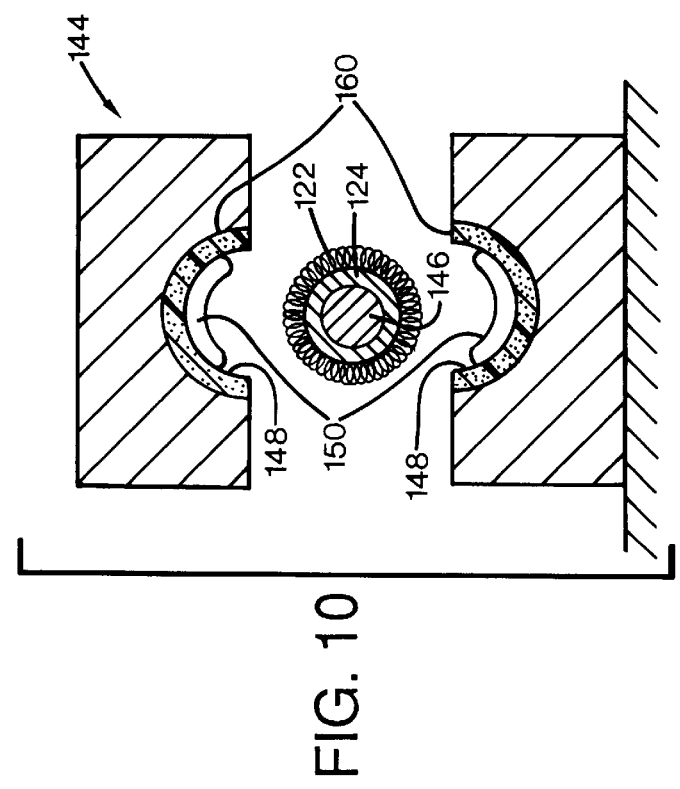

5,846,469

METHOD FOR MANUFACTURING A DEFIBRILLATION ELECTRODE

FIELD OF THE INVENTION

This invention relates to components for implantable medical devices, and more particularly to the manufacture of electrodes for cardiac stimulation devices.

BACKGROUND AND SUMMARY OF THE INVENTION

Defibrillators are implanted in patients susceptible to cardiac arrhythmias or fibrillation. Such devices provide cardioversion or defibrillation by delivering a high voltage shock via a conductive electrode in contact with the patient's heart or other tissue.

Past electrodes have employed metal coil wires partially embedded within a flexible silicone rubber body. One type of electrode body shape is a flat sheet or patch that overlays a portion of an exterior surface of a patient's heart or is subcutaneously implanted in the pectoral region; another type is an elongated flexible catheter that is inserted subcutaneously or within or near a chamber of the heart. Normally, such electrodes are produced by insert molding, which entirely encapsulates the wires within an insulative material. To provide electrical conduction to adjacent tissue, portions of the encapsulated wires are then exposed by removing some of the encapsulating material. This may be achieved by dissolving, ablating, or abrading portions of the material. U.S. Pat. No. 5,226,260 to Mar et al. illustrates a method of eroding the encapsulant with a blown stream of particulate abrasive.

While effective, the abrasive jet process of removing encapsulant to expose electrode conductors increases the complexity and cost of the manufacturing process. This time consuming "grit blasting" process (normally using sodium bicarbonate particles) requires skilled operation and subsequent thorough quality inspection to ensure uniform results. Even functionally ideal finished products may exhibit undesirable visual variations as a result of conventional abrading processes. Furthermore, existing processes may remove more encapsulant material than is desirable, forming pockets, recesses, and crevices that are generally undesirable for surgically implanted articles.

The disclosed embodiments overcome some or all of these disadvantages by providing a method of manufacturing an implantable electrode using a mold having a chamber with a compressible interior surface portion. A quantity of encapsulant and a conductive lead are placed into the chamber, and the mold is closed. With the mold closed, the compressible interior surface portion of the mold is biased against the lead at a region of contact with the lead, such that the biasing squeezes or excludes any encapsulant from between the lead and the mold at the region of contact.

The disadvantages of the prior art may also be overcome by providing an electrode with a body having an active portion with a smoothly contoured surface. The active portion includes a conductive wire partially embedded in an electrically insulative encapsulant, with the surface of the active portion comprising a major insulative surface portion defined by the surface of the encapsulant, and a plurality of curved conductive surface portions defined by exposed portions of the surface of the wire. Each of the conductive surface portions has a perimeter bounded by a skirt portion of the insulative surface portion, and each skirt portion is a smoothly curved transition between the insulative surface portion and the respective conductive surface portion, such that there are no sharp or rough grooves, angles, or edges on the active portion.

BRIEF DESCRIPTION OF THE DRAWINGS

FIG. 7 is a side view of the embodiment of FIG. 1 at a third stage of manufacturing.

FIG. 7A is an enlarged sectional view of the embodiment of FIG. 7.

FIG. 8 is a side view of the embodiment of FIG. 1 at a fourth stage of manufacturing.

FIG. 9 is a plan view of a second embodiment of the invention.

FIG. 10 is an axial sectional view of the embodiment of FIG. 9 at a first stage of manufacturing.

FIG. 11 is an axial sectional view of the embodiment of FIG. 9 at a second stage of manufacturing.

DETAILED DESCRIPTION OF A PREFERRED EMBODIMENT

Figure 1:
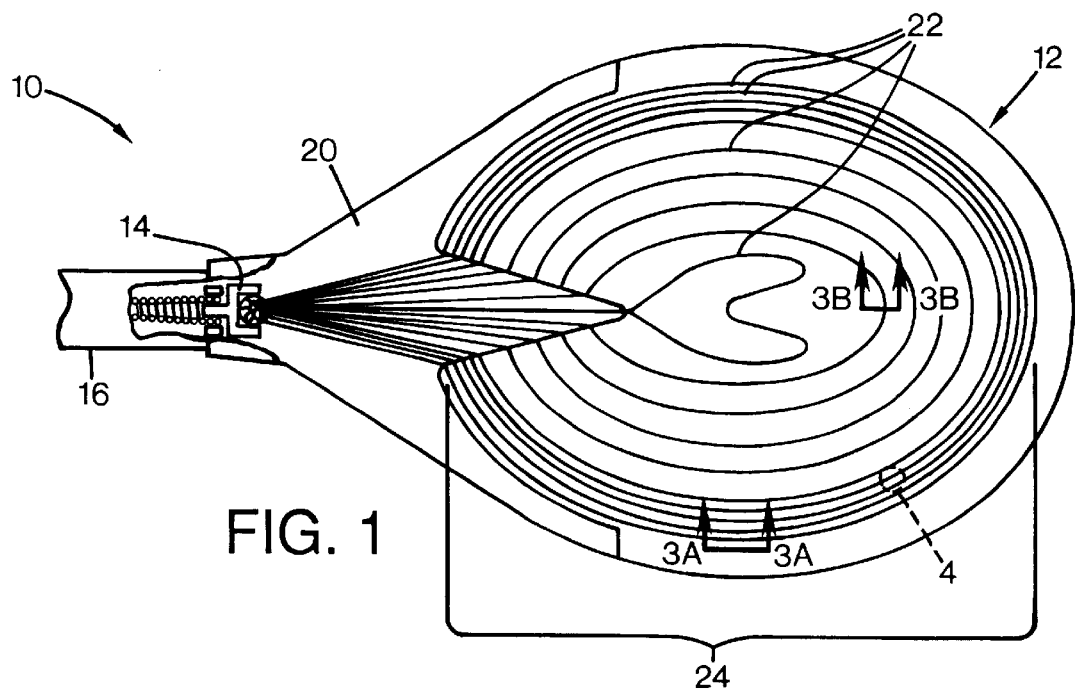
FIG. 1 is a plan view of a cardiac therapy device according to a preferred embodiment of the invention.

FIG. 1 shows a cardiac defibrillator electrode 10 having a planar, paddle-shaped patch body 12. A pin header 14 is embedded within one end of the patch body, with an elongated lead body 16 attached. A planar strain relief member 20 overlays the patch body 12 adjacent the lead body 16 to provide mechanical strength. A plurality of electrode wire loops 22 are partially embedded within the upper surface of the patch body. The wire loops are gathered at their ends and extend from the pin header 14, beneath the strain relief 20, and are arranged as generally concentric ovoids to form an active region 24. Because the loops are only partially embedded, exposed portions of the wires provide electrical contact with adjacent tissue. Typically, the electrode is sutured to the external surface of a heart, or is subcutaneously or submuscularly positioned on the chest wall. The exposed portions of the wires contact the heart or chest wall tissues to provide delivery of a defibrillation current generated by an implanted defibrillator unit (not shown) connected to the proximal end of the lead body 16.

Figure 2:
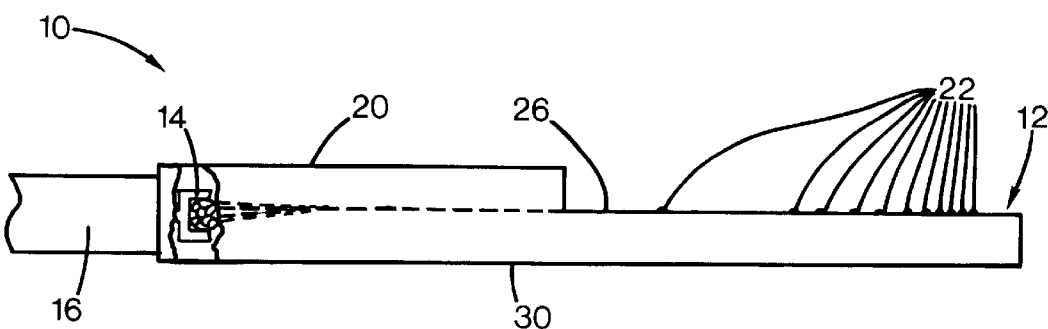
FIG. 2 is a side view of a cardiac therapy device according to the embodiment of FIG. 1.

As shown in FIG. 2, the body 12 is a flat sheet of substantially constant thickness and having an upper surface 26 and a lower surface 30, with the wire loops 22 embedded at the upper surface 26. The strain relief member 20 rests atop the upper surface 26, protecting the end portions of the wire loops 22 and capturing the pin header 14.

Figure 3B:
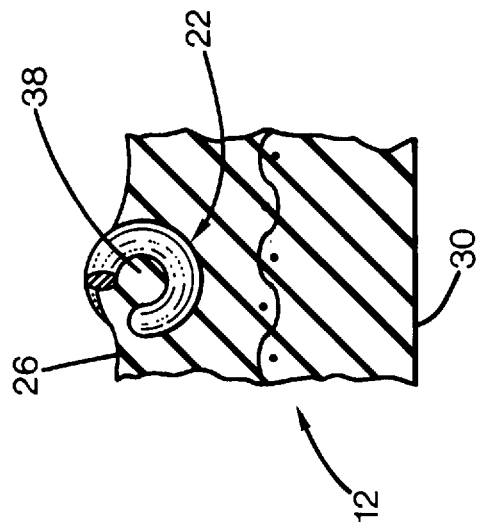
FIG. 3B is an enlarged sectional view of a portion of the device of FIG. 1 taken along line 3B—3B.
Figure 3A:
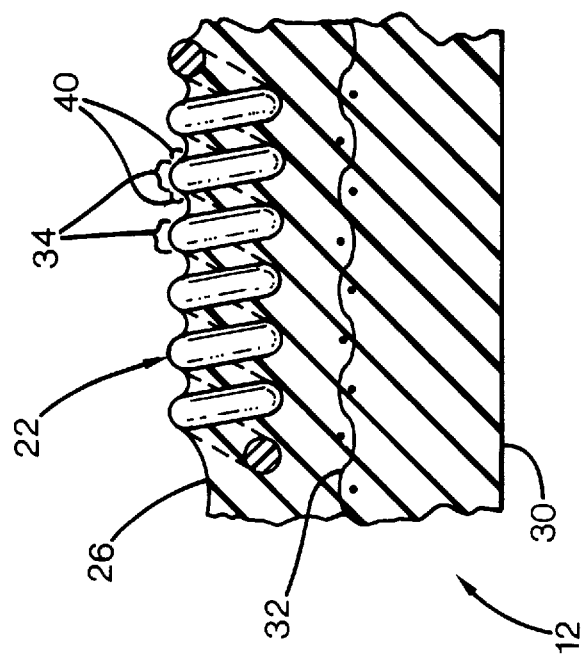
FIG. 3A is an enlarged sectional view of a portion of the device of FIG. 1 taken along line 3A—3A.

As shown in FIGS. 3A and 3B, the body 12 is a sheet of flexible silicone rubber with a synthetic fabric mesh 32 such as Dacron® polyester providing reinforcement in the center of the sheet. Preferably, the sheet has a thickness of about 0.030–0.040 inches (0.7–1.0 mm) where the wire 22 does not protrude. The wire 22 is space wound in the form of a helical coil with gaps separating each of the coil turns. The wire preferably has a diameter of about 0.003 inch (0.08 mm), and the overall coil diameter is about 0.012 inch (0.30 mm.)

Figure 4:
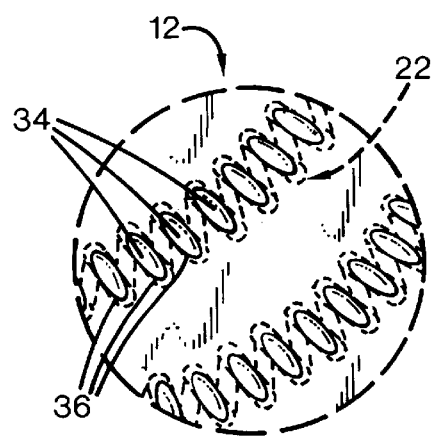
FIG. 4 is an enlarged plan view of a portion of the device of FIG. 1 as indicated on FIG. 1.

The majority of the wire coil 22 is encapsulated within the silicone rubber sheet, but each turn of the coil has an upwardly facing exposed portion 34 that protrudes above the surface of the silicone encapsulant. As shown in FIG. 4, the exposed portions 34 are ovoid in shape. Each exposed portion has a perimeter 36 beyond which the surface of the coil 22 is covered with silicone encapsulant. Each exposed portion has a length less than the diameter of the coil, and is narrower than the diameter of the wire. Thus, while each exposed portion faces upward at its center and curves away in all directions, at the perimeter the exposed surface portion is angularly offset from the plane of the body by less than 90 degrees, preferably about 45 degrees. This avoids any undercut pockets in the surface, reducing the unwanted possibility that tissue or contaminants may become trapped. With the disclosed geometry, the central bore 38 defined by the coil will be entirely filled with encapsulant.

In the preferred embodiment shown in FIG. 3A, the encapsulant surface curves upward to provide a smooth transition to the surface of the exposed wire portion 34. A skirt portion 40 surrounds each exposed portion 34. The skirt portion is negatively curved. That is, it has a concave curvature when viewed in a section (shown) taken radially to the center of the exposed portion, and a convex curvature when viewed in a section concentric with the ovoid perimeter 36. At the perimeter 36, the curved surface of the adjacent portion of the skirt 40 approaches tangency to the curved surface of the wire at the same location. Consequently, the entire upper surface 26, including the exposed wire portions 34, has a smoothly contoured profile lacking ridges, vertexes, angles, grooves, creases, or any other discontinuity of position or slope.

The resulting surface may be considered to be continuous and differentiable when modeled as a mathematical surface. The perimeter of each exposed portion essentially serves as a point of inflection of the surface; the exposed portion is entirely convex, and the adjacent skirt portion of the encapsulant surface is entirely concave on any section radial to the center of the corresponding exposed portion.

METHOD OF MANUFACTURING

Figure 5:
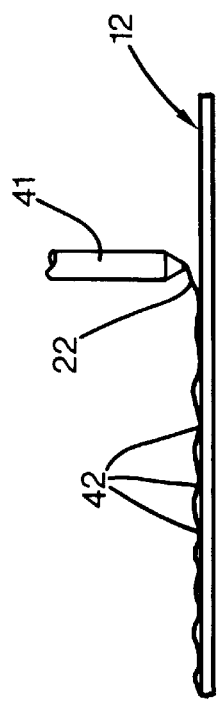
FIG. 5 is a side view of the embodiment of FIG. 1 at a first stage of manufacturing.
Figure 5A:
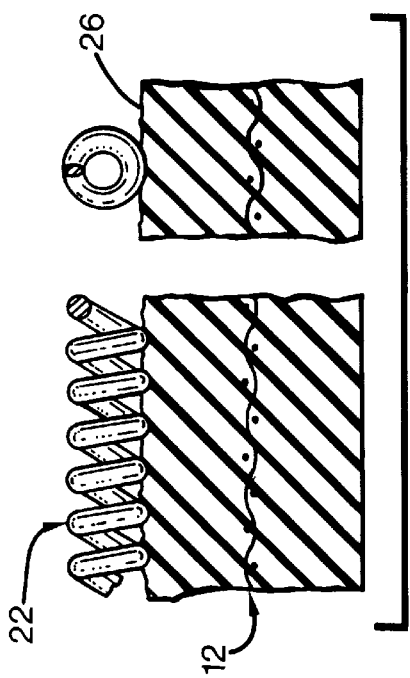
FIG. 5A is an enlarged sectional view of the embodiment of FIG. 5.

Initially, the body 12 is uncured, essentially a fabric mesh coated thickly on both sides with uncured silicone rubber. As shown in FIG. 5, the wire coil 22 is laid out on the uncured sheet in the desired pattern of loops. A wire feed tube 41 provides a single coil from a wire supply, and is computer controlled to lay out the selected pattern. The feed tube "tacks" the coil at intervals of 0.5–1.0 cm by pressing the coil downward slightly into the silicone at tack locations 42. This ensures that the pattern does not shift before curing, particularly as friction from the coil passing through the feed tube may tend to tug at the previously laid out coil. As shown in FIG. 5A, the coil 22 rests atop the upper surface 26 of the uncured silicone body 12 without substantially penetrating the surface or being covered by the silicone.

Figure 6:
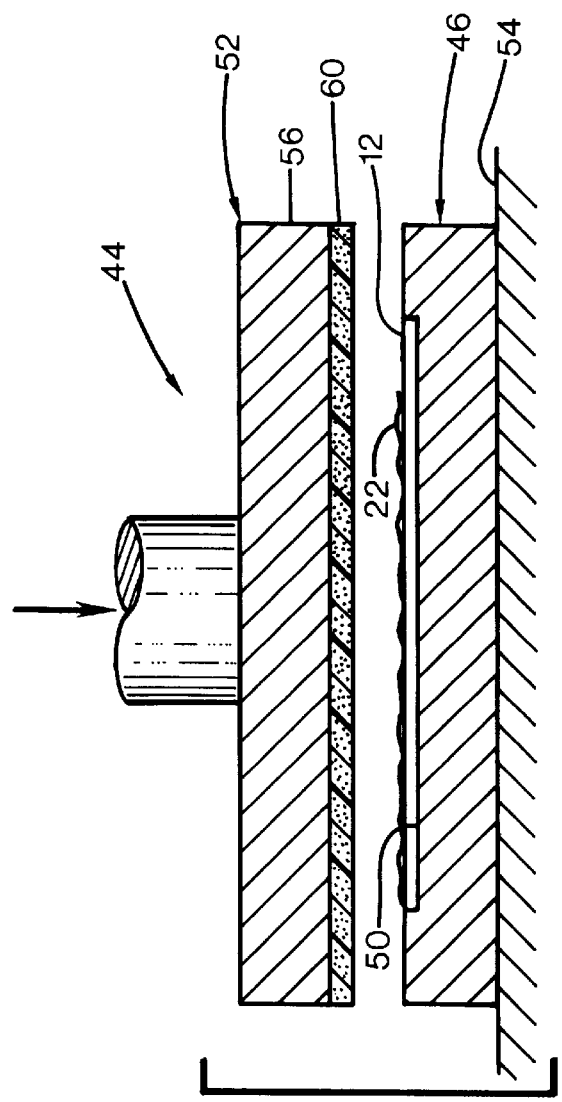
FIG. 6 is a side view of the embodiment of FIG. 1 at a second stage of manufacturing.

FIG. 6 shows the uncured patch body 12 with tacked coil 22 resting in a curing mold 44. The mold has a rigid metal base 46 with a recess 50 having the same profile as the patch body 12, and having a depth corresponding to the finished patch body thickness. The mold has a vertically movable press 52 above the base. The press is movable between an open position in which the recess 50 is exposed for insertion and removal of the body 12, and a closed position in which the press is biased against the base and encloses the recess. In the preferred embodiment, the base 46 is a movable carrier that holds the patch body 12 during the coil layout process of FIG. 5. The base is formed of stainless steel and may be placed atop a heated surface 54 for curing the body during molding.

The upper press portion 52 of the mold has a rigid, flat body 56, with a compressible layer 60 covering the lower surface of the body 56 that faces the recess 50. The compressible layer is preferably a heat resistant elastic sheet having a smooth, tough lower surface that is non-wetting with respect to water or uncured silicone. That is, it has a large contact angle such that these fluids tend to bead up readily, facilitating easy release of the cured body from the compressible layer 60. Preferably, closed cell Teflon® foam is employed, although any material or structure having elastomeric properties may be used, such as solid elastomers and gas- or fluid-filled bladders. The layer need not be elastic, but must provide a flat shape where it does not meet resistance, and yield, deform, or conform by a limited amount when it encounters a coil 22, so that the coil is not pressed entirely below the surface, but protrudes a limited amount. If an inelastic deformable material is selected, such a layer must either be replaced for each pressing operation, or be reformed to a flat or neutral contour prior to processing the next device. The illustrated press configuration is shown in a simplified format for clarity. In practice, the upper portion 52 may include a flat press plate coextensive with and separate from the upper mold plate 56, so that the molds may be covered by the upper mold plate 56 prior to the pressing and curing operation. In addition, the lower portion of the press may be made movable relative to a fixed upper portion of the press.

In FIG. 7, the mold is in the closed position, with the press 52 biased against the base 46. As press moves to the closed position, it begins to force the coils into the encapsulant of the body 12. However, the compliant nature of the flexible layer 60 causes it to dimple locally where it encounters the upper portion of each turn of the coil, as shown in FIG. 7A. If the encapsulant were a non-viscous fluid, the dimpling would be temporary as the coil settled into the fluid. In the preferred embodiment, however, the viscous nature of uncured silicone causes the coil turns to slightly protrude as the resistance of the encapsulant balances the slight force generated by the dimpling of the compressible layer. This resistance may be enhanced by adjusting the ratio of the coil diameter to the thickness of the body 12, whereby greater coil protrusion may be obtained by selecting sizes that cause it to encounter the mesh layer 32. Alternatively, curing of the body may begin prior to pressing, particularly by heating from the bottom. This is believed to provide a viscosity gradient through the thickness of the body that limits the depth to which the coil may be pressed.

During pressing, the surface of the flexible layer 60 directly contacts the upper portions of the coil with sufficient pressure to prevent encapsulant from intervening. This ensures that the exposed portions 34 of the coil are fully electrically conductive. During pressing and curing, the surface of the flexible layer remains smoothly contoured to maintain the surface geometry properties discussed above with respect to the finished product. In an alternative embodiment, pressing and curing may occur under a vacuum to eliminate trapped air pockets at the surface.

FIG. 8 shows the remaining assembly steps. The coils 22 have been welded at their ends to form a ball 62, which is wedged into the receptacle of pin header 14. Strain relief member 20 is applied to seal the pin header so that only pin 64 is exposed for connection to lead body 16. In an alternative process, the pin header may be attached to the welded coils, and the strain relief applied prior to pressing and curing. The lead may also be connected prior to curing to provide a permanent connection. In either alternative, the shape of the mold recess and flexible layer would require adjustment to reflect the desired contours of the finished product.

ALTERNATIVE EMBODIMENT

FIG. 9 illustrates a cylindrical, elongated lead 110 of the type disclosed in U.S. Pat. No. 5,439,485 to Mar et al. The lead has an active electrode portion 112 electrically connected to an insulated conductor 114 that provides connection to an implanted defibrillator unit (not shown). The electrode is intended to be transvenously implanted within the right ventricle of a patient's heart, where it may provide conduction of therapeutic electrical impulses to heart tissue by direct contact or via blood in the chamber.

The active electrode portion includes six wire coils 122 of the type described above with respect to the preferred embodiment, arranged in parallel and wrapped helically about a core tube 124 supported on mandrel 146, as shown in FIG. 10. Returning to FIG. 9, the coils 122 are mostly encapsulated in silicone rubber so that only a small exposed portion of each coil turn remains uncovered. The surface of the encapsulant and of the exposed portions of the coils are smoothly contoured, and thus share the essential geometric and physical properties discussed above regarding the preferred embodiment.

The alternative electrode may be manufactured by insert molding. Initially, the coils 122 are wrapped about the core tube 124, then placed in a mold 144 defining a cylindrical cavity when closed. The mold has two halves, each defining a semicylindrical recess. The surface of each recess is lined with a compressible layer 160 having the same properties discussed above in the preferred embodiment. A measured quantity of uncured silicone rubber 150 is placed in each recess. The coil-wrapped core tube 124 on mandrel 146 is then placed in the mold, and the mold closed. The mold is sized so that the diameter of the cavity is slightly smaller than the outside diameter of the coil-wrapped core tube, such that the outermost portions of the coil cause dimpling of the compressible layer to exclude or squeeze away any encapsulant at the regions of contact between the coils and the compressible layer. The mold is then heated to cure the encapsulant while the mold is closed and the compressible layer dimpled.

Another alternative embodiment of the method illustrated in FIGS. 10 and 11 has the positions of the coil 122 and the encapsulant 150 layers reversed. Consequently, the compressible material 148 will make direct contact with the coils 122, as in the first "patch" embodiment.

Other alternative embodiments also contemplate the use of straight wires or wire meshes instead of the illustrated helical coils in either the patch or catheter lead configuration. The geometry of the electrodes may also take any shape within a wide range. Although the above invention is described in terms of a preferred embodiment, the invention is not intended to be so limited.

What is claimed is:

1. A method of manufacturing an implantable electrode comprising the steps:

providing a mold having an open position and a closed position and defining a chamber having at least a first interior surface portion comprising a compressible material;

placing a conductive lead into the chamber;

placing an encapsulant into the chamber;

moving the mold from the open position to the closed position; and with the mold in the closed position, biasing the first surface portion of the mold against the lead at a region of contact on the lead, such that the biasing squeezes or excludes any encapsulant from between the lead and the mold at the region of contact.

2. The method of claim 1 including curing the encapsulant while biasing the first surface portion of the mold against the lead.

3. The method of claim 2 including heating the mold.

4. The method of claim 1 wherein the chamber includes a rigid second interior surface portion opposite the compressible first interior surface portion.

5. The method of claim 1 wherein placing the lead and the encapsulant into the chamber comprises attaching the lead to a sheet having a surface portion including uncured encapsulant.

6. The method of claim 1 wherein placing the lead into the chamber includes forming the lead into a pattern of lead segments occupying a common plane.

7. The method of claim 1 wherein the chamber comprises a cylindrical, elongated chamber including compressible surface portions along at least a major portion of the length of the chamber.

8. The method of claim 7 wherein placing the lead into the chamber includes providing a lead assembly having a conductive wire helically wrapped about an elongated mandrel, and placing the assembly into the chamber.

9. The method of claim 1 wherein the lead has an undulating shape such that it is contacted by the compressible surface at a plurality of regions of contact.

10. The method of claim 1 wherein the compressible surface has a smooth surface.

11. The method of claim 1 wherein the compressible surface is formed of a non-wettable flexible element.

12. The method of claim 1 wherein the compressible surface is formed of a foamed polymer.

13. A method of manufacturing an implantable electrode comprising the steps:

(a) providing a mold having an open position and a closed position and defining a chamber having at least a first interior surface portion comprising a compressible material;

(b) placing uncured silicone rubber into the chamber;

(c) placing a conductive lead into the chamber;

(d) moving the mold from the open position to the closed position;

(e) with the mold in the closed position, biasing the first surface portion of the mold against the lead at a region of contact on the lead, such that the biasing squeezes or excludes any silicone rubber from between the lead and the mold at the region of contact; and (f) curing the silicone rubber.

14. The method of claim 13, wherein said step (c) comprises pressing the conductive lead partially into the uncured silicone rubber such that the conductive lead will remain substantially in position for steps (d)–(f).

* * * * *